United States Patent
Borghi et al.

(10) Patent No.: US 6,575,522 B2
(45) Date of Patent: Jun. 10, 2003

(54) VEHICLE WITH MOVABLE SPOILERS

(75) Inventors: Fabio Borghi, Modena (IT); Stefano Carmassi, Pisa (IT); Federico Ghirardi, Parma (IT); Franco Zambelli, Solignano-Castelvetro (IT)

(73) Assignee: Ferrari S.p.A., Modena (IT)

( * ) Notice: Subject to any disclaimer, the term of this patent is extended or adjusted under 35 U.S.C. 154(b) by 0 days.

(21) Appl. No.: 10/021,273

(22) Filed: Dec. 19, 2001

(65) Prior Publication Data

US 2002/0093220 A1 Jul. 18, 2002

(30) Foreign Application Priority Data

Dec. 19, 2000 (IT) ..................................... BO00A000731

(51) Int. Cl.[7] .............................................. B62D 37/02
(52) U.S. Cl. .................................. 296/180.5; 296/180.1
(58) Field of Search ........................... 296/180.1, 180.4, 296/180.5

(56) References Cited

U.S. PATENT DOCUMENTS

| | | | | | |
|---|---|---|---|---|---|
| 3,768,582 A | * | 10/1973 | Phillippe | .................. | 296/180.5 |
| 4,119,339 A | * | 10/1978 | Heimburger | ............. | 296/180.5 |
| 4,486,046 A | * | 12/1984 | Whitney et al. | ......... | 296/180.4 |
| 4,489,806 A | * | 12/1984 | Shimomura | ............... | 296/180.5 |
| 4,511,170 A | * | 4/1985 | Sankrithi | .................. | 296/180.1 |
| 4,558,897 A | * | 12/1985 | Okuyama et al. | ........ | 296/180.5 |
| 4,660,879 A | * | 4/1987 | Kobayashi et al. | ...... | 296/180.4 |
| 4,674,788 A | * | 6/1987 | Ohmura et al. | .......... | 296/180.5 |
| 4,758,037 A | * | 7/1988 | Suzuki et al. | ............ | 296/180.5 |
| 4,810,022 A | * | 3/1989 | Takagi et al. | ............ | 296/180.5 |
| 5,222,438 A | * | 6/1993 | Ende | ........................ | 296/180.1 |
| 5,322,340 A | | 6/1994 | Sato et al. | ............... | 296/180.1 |
| 5,454,619 A | * | 10/1995 | Haraway | ..................... | 372/88 |
| 5,544,931 A | * | 8/1996 | Nelson | ..................... | 296/180.1 |
| 5,598,990 A | * | 2/1997 | Farokhi et al. | .......... | 296/180.1 |
| 5,688,020 A | * | 11/1997 | Burg | ....................... | 296/180.1 |
| 6,033,010 A | * | 3/2000 | Preiss | ...................... | 296/180.1 |
| 6,079,769 A | * | 6/2000 | Fannin et al. | ............ | 296/180.1 |
| 6,196,620 B1 | * | 3/2001 | Haraway, Jr. | ............ | 296/180.1 |

FOREIGN PATENT DOCUMENTS

| | | |
|---|---|---|
| DE | 38 28 752 | 3/1990 |
| JP | 60-012380 | 1/1985 |
| JP | 60-092993 | 5/1985 |

* cited by examiner

*Primary Examiner*—D. Glenn Dayoan
*Assistant Examiner*—Lori L Coletta
(74) *Attorney, Agent, or Firm*—Steptoe & Johnson LLP; D. Douglas Price

(57) ABSTRACT

A vehicle with movable spoilers, the vehicle having at least one spoiler movable between a minimum-angle position producing a minimum increase in vertical load, and a maximum-angle position producing a maximum increase in vertical load; and a spoiler actuating device for adjusting the position of the spoiler between the minimum-angle position and maximum-angle position as a function of the speed of the vehicle; the spoiler actuating device providing, up to a given maximum speed, for adjusting the position of the spoiler to increase the vertical load as speed increases, and for maintaining the vertical load at a substantially constant given value as long as the speed of the vehicle exceeds the maximum speed.

7 Claims, 4 Drawing Sheets

VEHICLE WITH MOVABLE SPOILERS

The present invention relates to a vehicle with movable spoilers.

BACKGROUND OF THE INVENTION

As is known, many high-performance vehicles have spoilers appropriately located on the vehicle body to increase the vertical load on the vehicle in movement and so improve road-holding and traction.

Spoilers, however, have the major drawback of impairing the aerodynamic efficiency of the vehicle, so that considerably more power is required to achieve and maintain a given vehicle speed.

By way of a solution to the problem, some vehicle manufacturers have equipped certain models with spoilers which are movable selectively, on command, to assume a rest or minimum-angle position in which the aerodynamic efficiency of the vehicle is affected as little as possible, or an extracted or maximum-angle position to increase the vertical load on the vehicle in movement and so improve road-holding and traction. The switch from the minimum- to maximum-angle position is made when the vehicle exceeds a predetermined threshold speed.

In recent years, the need to reduce pollutant emissions and reduce fuel consumption has induced manufacturers to perfect the movable-spoiler solution by enabling spoilers to be set to any position between the minimum- and maximum-angle positions, thus enabling spoiler position control as a function of vehicle speed. That is, the spoiler angle can be increased in proportion to vehicle speed so as to gradually increase the vertical load on the vehicle as speed increases.

Though excellent in terms of fuel consumption, particularly at low speed, the above solution seriously complicates high-speed performance of the vehicle.

Firstly, as speed increases, the vehicle tends to sink dangerously close to the road surface.

Secondly, as speed increases, the vertical load on the vehicle gradually compresses and distorts the suspensions, thus making the vehicle harder to drive. More specifically, the vertical load on the vehicle affects certain characteristics of the suspensions, such as travel and camber angle, thus resulting in a radical change in vehicle performance in the presence of attitude variations caused when driving over rough road surfaces. Which change can only be partly counteracted by adopting extremely complex, high-cost suspension design solutions.

While improving road-holding and traction, the gradual increase in vertical load also makes steering harder, thus impairing driving comfort at high speed.

SUMMARY OF THE INVENTION

It is therefore an object of the present invention to provide a vehicle with movable spoilers, designed to eliminate the aforementioned drawbacks.

According to the present invention, there is provided a vehicle with movable spoilers, the vehicle having at least one spoiler movable between a minimum-angle position producing a minimum increase in vertical load, and a maximum-angle position producing a maximum increase in vertical load; and spoiler actuating means for adjusting the position of the spoiler between said minimum-angle position and said maximum-angle position as a function of the speed of the vehicle; the vehicle being characterized in that the spoiler actuating means provide, up to a given maximum speed, for adjusting the position of the spoiler to increase the vertical load as speed increases, and for maintaining the vertical load at a substantially constant given value as long as the speed of the vehicle exceeds said maximum speed.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
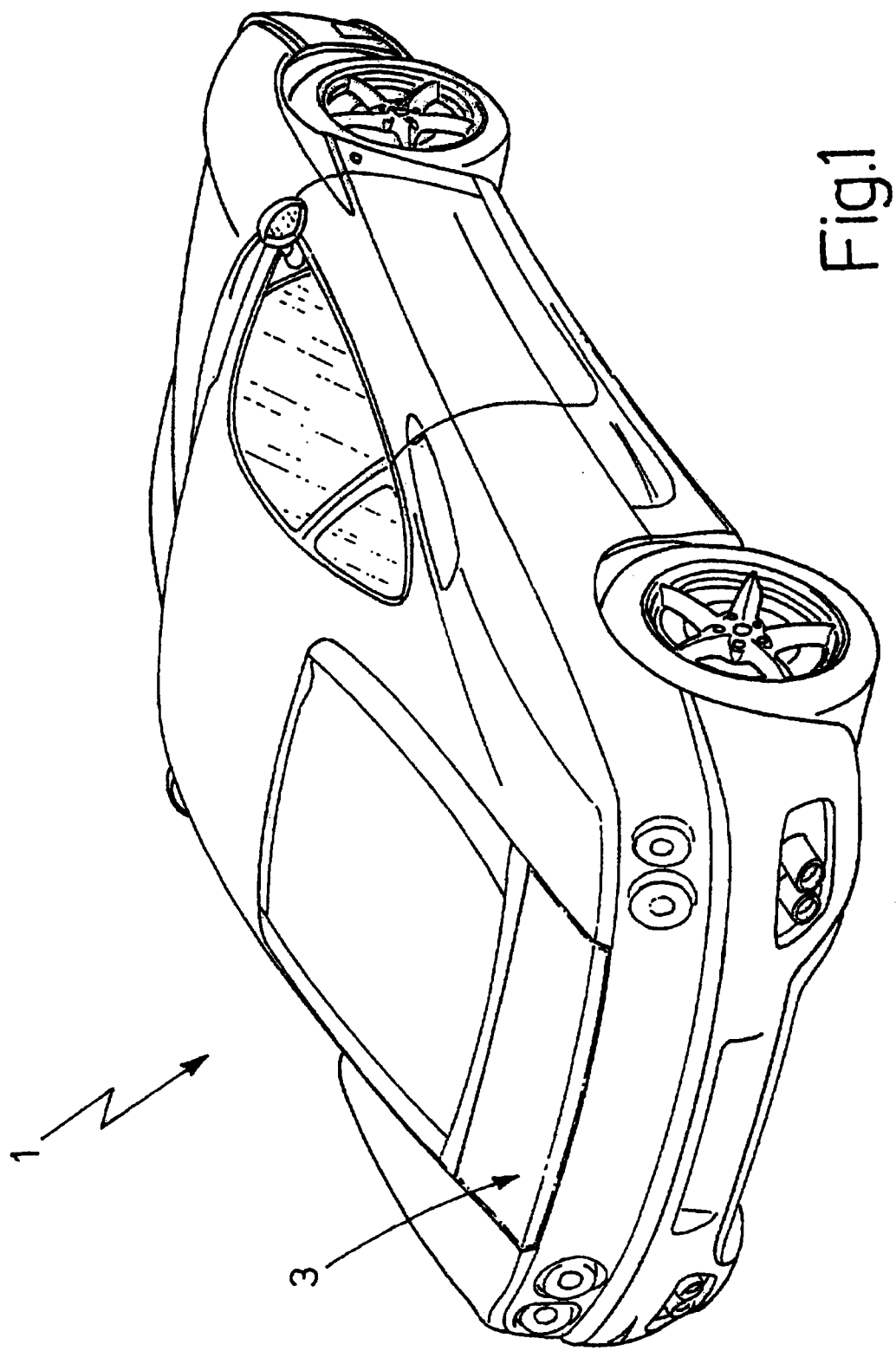
FIG. 1 shows a view in perspective, with parts removed for clarity, of a vehicle with movable spoilers in accordance with the teachings of the present invention.
Figure 2:
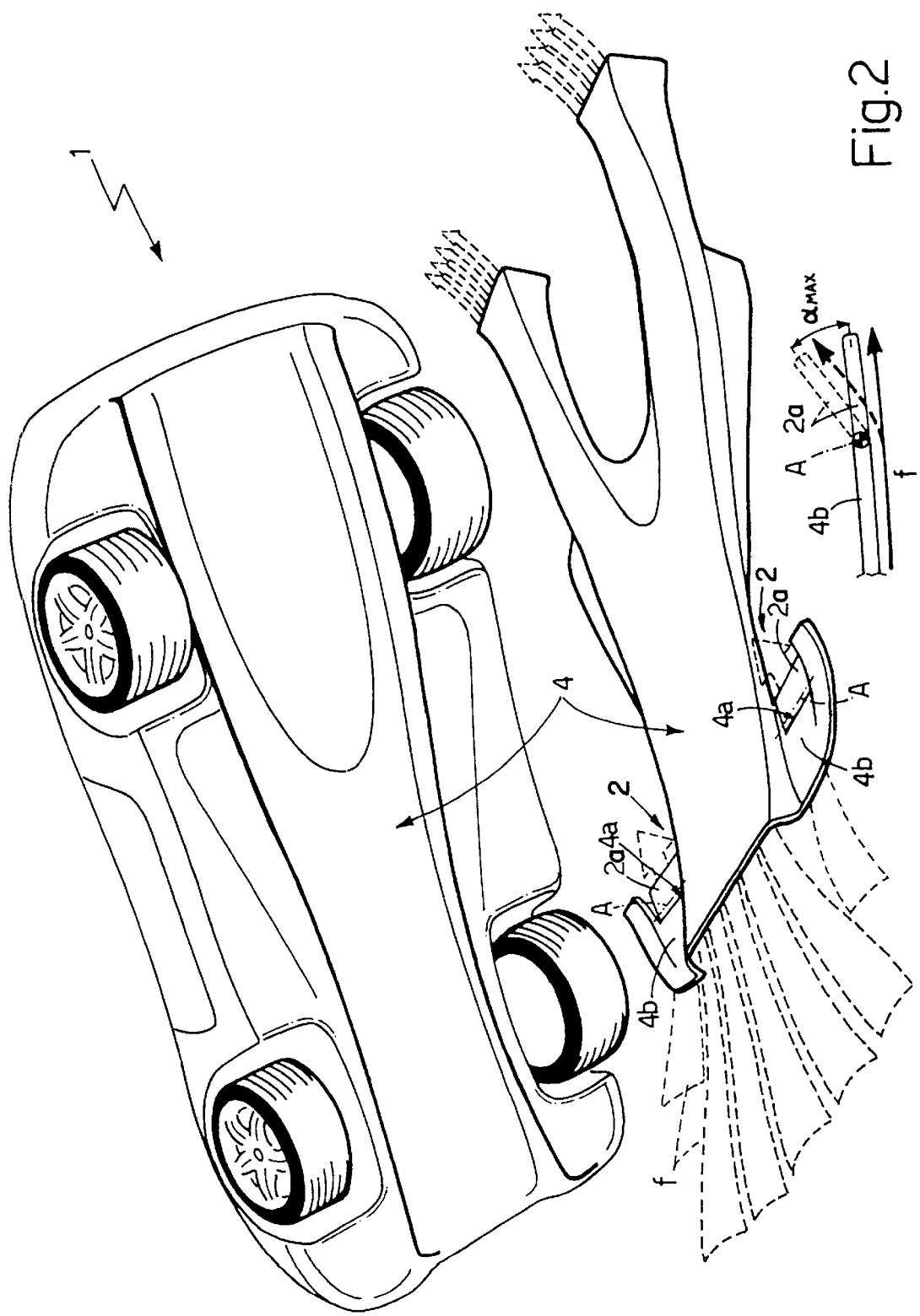
FIG. 2 shows a view in perspective of a detail of the front underside of the FIG. 1 vehicle.
Figure 3:
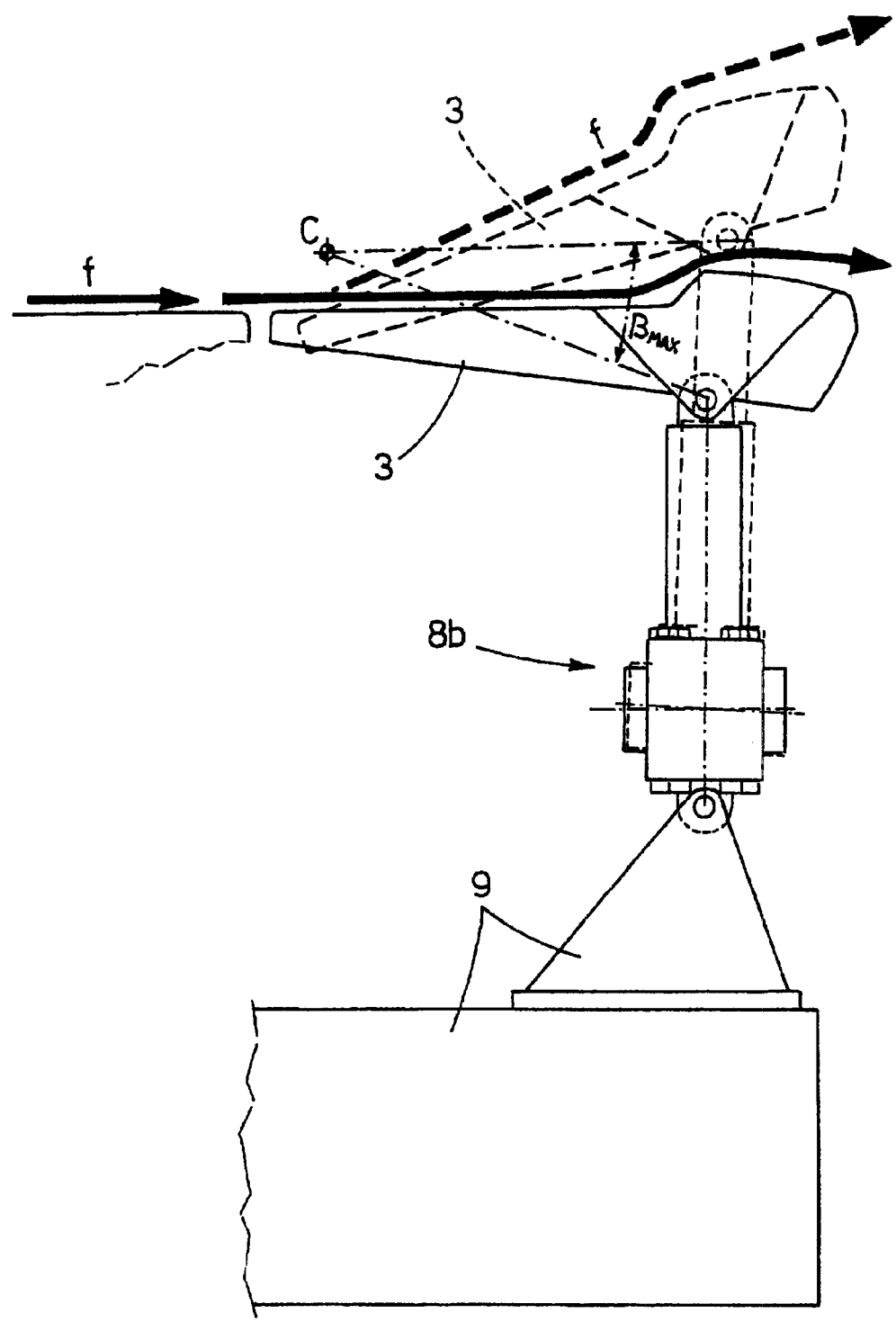
FIG. 3 shows a schematic section of the rear of the FIG. 1 vehicle.

With reference to FIGS. 1, 2 and 3, number 1 indicates as a whole a vehicle having one or more movable spoilers appropriately located on the vehicle body to increase the vertical load on vehicle 1 in movement and so improve road-holding and traction.

In the example shown, vehicle 1 comprises a front spoiler 2 and a rear spoiler 3, both movable between a rest or minimum-angle position producing a minimum increase in the vertical load generated by the spoilers, and so impairing as little as possible the overall aerodynamic efficiency of the vehicle, and a fully-extracted or maximum-angle position producing a maximum increase in the vertical load produced by the spoilers.

More specifically, front spoiler 2 and rear spoiler 3 can each assume any position between the minimum- and maximum-angle positions, so as to produce, on command, any increase in vertical load between a minimum and maximum increase.

With reference to FIG. 2, in the example shown, front spoiler 2 is defined by two flat appendixes, each of which is hinged to a respective portion of the peripheral edge 4a of the flat bottom 4 of vehicle 1, so as to rotate flapwise about an axis A of rotation parallel to the edge of flat bottom 4.

More specifically, each flat appendix 2a is hinged to peripheral edge 4a of flat bottom 4 at the trailing end of a respective chute extractor 4b formed on flat bottom 4, and rotates flapwise to assume any position between a minimum-angle position, in which flat appendix 2a is substantially coplanar with the part of flat bottom 4 defining the trailing end of chute extractor 4b, so as not to interfere with the air stream f flowing along flat bottom 4, and a maximum-angle position, in which flat appendix 2a is tilted at a predetermined angle $\alpha_{max}$ with respect to the part of flat bottom 4 defining the trailing end of chute extractor 4b, so as to achieve a given angle of incidence of air stream f on flat appendix 2a.

It should be pointed out that, in all the positions between the minimum- and maximum-angle positions, flat appendix 2a is tilted at an angle a smaller than angle $\alpha_{max}$.

With reference to FIG. 3, in the example shown, rear spoiler 3 is defined by a contoured panel fitted movably at the rear end of vehicle 1 so as to rotate about a substantially horizontal axis C of rotation.

More specifically, contoured panel 3 rotates about axis C to assume any position between a minimum-angle position, in which contoured panel 3 is substantially coplanar with the surrounding body of vehicle 1, so as not to interfere with the air stream f flowing along the vehicle body surface, and a maximum-angle position, in which contoured panel 3 is tilted at a predetermined angle $\beta_{max}$ with respect to the surrounding vehicle body, so as to achieve a given angle of incidence of air stream f on contoured panel 3.

It should be pointed out that, in all the positions between the minimum- and maximum-angle positions, contoured panel 3 is tilted at an angle $\beta$ smaller than angle $\beta_{max}$.

Figure 4:
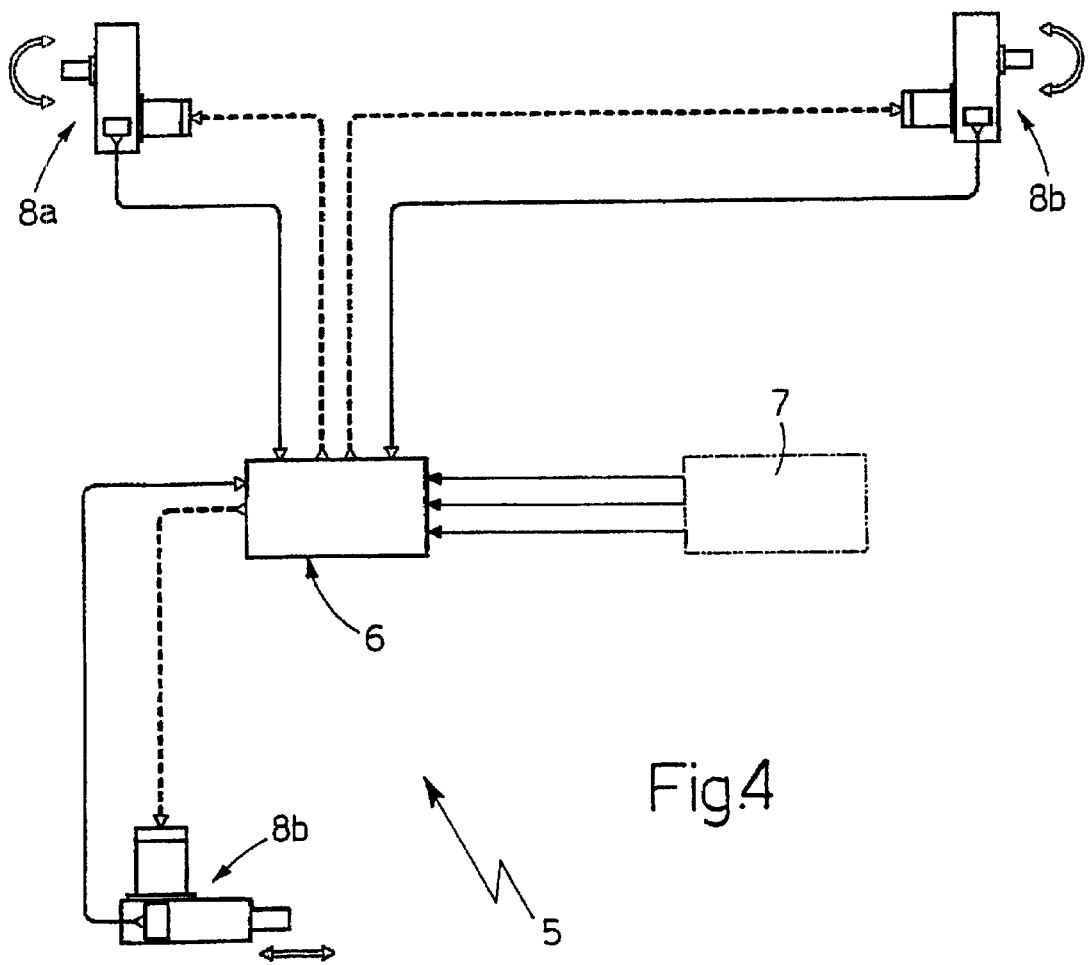
FIG. 4 shows a schematic view of a spoiler actuating device of the FIG. 1 vehicle.

With reference to FIGS. 3 and 4, vehicle 1 also comprises a spoiler actuating device 5 for determining—on the basis of the instantaneous speed of vehicle 1, and possibly also other status variables, such as steering wheel rotation angle, longitudinal and transverse vehicle acceleration, accelerator pedal position, etc.—the best positions of front and rear spoilers 2 and 3, and then setting the spoilers accordingly.

Obviously, the best positions determined for front and rear spoilers 2 and 3 must fall within the corresponding minimum- and maximum-angle positions.

In the example shown, actuating device 5 comprises a number of electromechanical actuators for setting front and rear spoilers 2 and 3, on command, to any position between the corresponding minimum- and maximum-angle positions; and an electronic central control unit 6 for controlling the electromechanical actuators as a function of information acquired from other electronic central control units and/or sensors 7 on vehicle 1.

Figure 5:
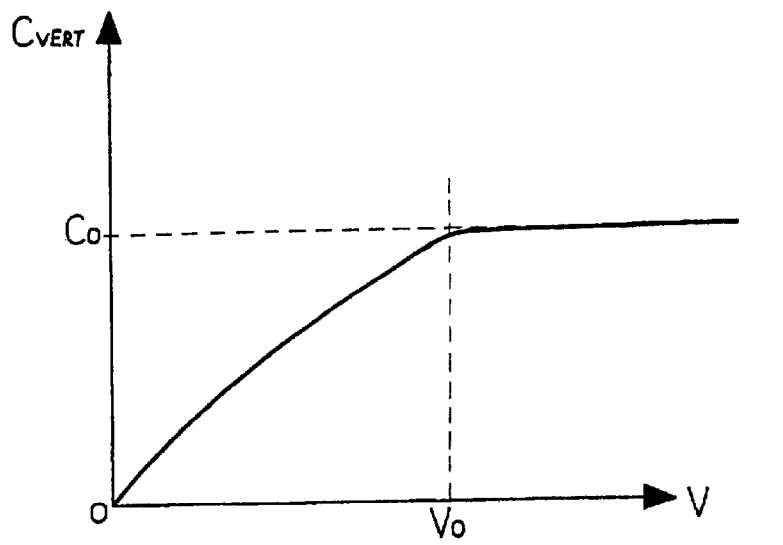
FIG. 5 shows a graph of the vertical load produced by the spoilers as a function of vehicle speed.

With reference to FIG. 5, it should be pointed out that electronic central control unit 6 controls the electromechanical actuators so as to increase the vertical load on vehicle 1, as a function of speed, up to a maximum speed $V_0$ (e.g. 240 km/h), and then maintain it at a substantially constant value $C_0$ as long as the speed of vehicle 1 exceeds maximum speed $V_0$.

With reference to FIGS. 3 and 4, the electromechanical actuators are of known type and preferably, though not necessarily, supply an electric output signal indicating the instantaneous position of the spoiler to which they are connected.

In the particular example shown, actuating device 5 comprises two angular electromechanical actuators 8*a*, each for moving, on command, a respective flat appendix 2 on flat bottom 4; and at least one linear electromechanical actuator 8*b* for moving contoured panel 3 on command.

More specifically, each angular electromechanical actuator 8*a* has the output shaft connected mechanically to respective flat appendix 2*a*, so as to rotate flat appendix 2*a*, on command, about respective axis A; while linear electromechanical actuator 8*b* has two axial ends.

Both types of electromechanical actuators have encoders and stop sensors for supplying an electric output signal indicating the configuration of the actuators, so as to enable electronic central control unit 6 to determine the instantaneous positions of front and rear spoilers 2 and 3.

Operation of vehicle 1 is easily deducible from the foregoing description with no further explanation required.

The advantages of a vehicle 1 featuring movable spoilers 2 and 3 operating as shown in FIG. 5 are obvious: maintaining a substantially constant vertical load when the speed of vehicle 1 exceeds maximum speed $V_0$ prevents the bottom of vehicle 1 from coming dangerously close to the road surface, and, even more importantly, prevents an excessive vertical load from distorting the suspensions of vehicle 1 and so making vehicle 1 hard to handle.

It should be pointed out that numerous road tests of currently used vehicles with movable spoilers have surprisingly shown the vertical load on the vehicle at high speed to be far more than that required to ensure excellent road-holding and traction.

Tests have also shown that maintaining a constant vertical load when the speed of vehicle 1 exceeds maximum speed $V_0$ provides for significantly reducing fuel consumption of vehicle 1.

Clearly, changes may be made to vehicle 1 as described and illustrated herein without, however, departing from the scope of the present invention.

In particular, electronic central control unit 6 may be programmed to produce a maximum vertical load on vehicle 1 when decelerating sharply, so to maximize the braking capacity of vehicle 1.

We claim:

1. A vehicle comprising movable spoilers, the vehicle having at least one spoiler movable between a minimum-angle position producing a minimum increase in vertical load, and a maximum-angle position producing a maximum increase in vertical load, and spoiler actuating means for adjusting the position of the spoiler between said minimum-angle position and said maximum-angle position as a function of the speed of the vehicle, the vehicle having spoiler actuating means for adjusting, up to a given maximum speed, the position of the spoiler to increase the vertical load as speed increases, and for maintaining the vertical load at a substantially constant given value as long as the speed of the vehicle exceeds said maximum speed.

2. The vehicle as claimed in claim 1, wherein the spoiler actuating means comprise at least one electromechanical actuator for setting said spoiler, on command, to any position between the minimum-angle position and the maximum-angle position.

3. The vehicle as claimed in claim 2, wherein the spoiler actuating means comprise an electronic central control unit which controls said electromechanical actuator as a function of information acquired from other electronic central control units, sensors, or electronic central control units and sensors on said vehicle.

4. The vehicle as claimed in claim 1, further comprising at least one spoiler at the rear of the vehicle.

5. The vehicle as claimed in claim 1, further comprising at least one spoiler at the front of the vehicle.

6. The vehicle as claimed in claim 5, wherein the front spoiler is defined by two flat appendixes, each of which is hinged to a respective portion of the peripheral edge of a flat bottom of the vehicle so as to rotate flapwise at said edge.

7. The vehicle as claimed in claim 6, wherein each flat appendix is hinged to the peripheral edge of the flat bottom at a trailing end of a respective chute extractor formed on the flat bottom.

* * * * *